United States Patent [19]

Jönsson et al.

[11] Patent Number: 4,595,208
[45] Date of Patent: Jun. 17, 1986

[54] LINING OF NON-METALLIC MATERIAL

[75] Inventors: Nils Å. Jönsson, Staffanstorp; Bengt Mossberg, Lund, both of Sweden

[73] Assignee: Alfa-Laval AB, Tumba, Sweden

[21] Appl. No.: 610,290

[22] PCT Filed: Sep. 8, 1983

[86] PCT No.: PCT/SE83/00317
  § 371 Date: May 7, 1984
  § 102(e) Date: May 7, 1984

[87] PCT Pub. No.: WO84/01209
  PCT Pub. Date: Mar. 29, 1984

[30] Foreign Application Priority Data

Sep. 14, 1982 [SE] Sweden .................................. 8205231

[51] Int. Cl.⁴ ............................................. F16J 15/00
[52] U.S. Cl. .................................. 277/206 R; 165/167
[58] Field of Search ............................... 165/166, 167; 277/206 R

[56] References Cited

U.S. PATENT DOCUMENTS

| 2,191,044 | 2/1940 | Seligman | 165/167 |
| 2,790,627 | 4/1957 | Wakeman | 165/167 |
| 3,908,717 | 9/1975 | Rademacher et al. | 277/206 R |
| 4,201,393 | 5/1980 | Kawashima et al. | 277/206 R |

Primary Examiner—Robert I. Smith
Attorney, Agent, or Firm—Cyrus S. Hapgood

[57] ABSTRACT

This invention relates to a lining of non-metallic material for inlet ports and outlet ports of a frame plate and/or a pressure plate of a plate heat exchanger.

The lining comprises a cylindrical part (10) and at least one but preferably two flanges (11, 12). In this connection the flange (11) that is intended to be positioned between a heat exchanger plate and a frame plate and/or a pressure plate is so thin that no machining of the latter needs to be done.

10 Claims, 6 Drawing Figures

LINING OF NON-METALLIC MATERIAL

This invention relates to a lining of non-metallic material for lining of inlet ports and outlet ports of a frame plate and/or a pressure plate of plate heat exchangers and comprising a cylindrical part and at least one but preferably two flanges which at the use of the lining are positioned on each side of the frame plate and/or the pressure plate.

A plate heat exchanger comprises a number of heat exchanger plates which are fastened between a frame plate and a pressure plate. In the frame plate and/or the pressure plate there are made inlet ports and outlet ports for the heat exchanging media. In these inlet ports and outlet ports there are often linings inserted which can be made of different materials. The insertion of such linings implies that the frame plate and/or the pressure plate will not come into contact with the heat exchanging medium which can be corrosive. Due to that fact the frame plate and/or the pressure plate can be made of a cheap material.

The use of conventional linings, however, has involved machining of the inlet ports and the outlet ports of the frame plate and/or the pressure plate, because the thickness of the flange of the lining has been so large that without machining in the form of recesses round the inlet ports and the outlet ports of the frame plate and/or the pressure plate the flange should have encroached too much upon the structural measure of the heat exchanger. Moreover, problems should have arisen regarding the contact between a heat exchanger plate and the frame plate and/or the pressure plate.

The British Pat. No. 1.041.805 discloses a lining that is made of an elastic material and that is intended to be inserted into an inlet port or an outlet port of a frame plate or a pressure plate. The lining comprises a cylindrical part having a flange in each end. In this connection the flange that is intended to rest against the heat exchanger plate is so thick that machining in the form of a recess round the inlet ports and the outlet ports has had to be done in the frame plate. Such a machining is both expensive and time-consuming.

German patent publication No. 23 57 059 also discloses a lining made of an elastic material for use in a plate heat exchanger.

In FIG. 3 of the patent publication there is shown a schematic sketch of the position of the lining in a frame plate. In this case a relatively thick flange of the lining has been outlined between the frame plate and the first heat exchanger plate, the frame plate appearing to be unmachined. This will, however, probably depend on the fact that the drawing is of a schematical nature, because the apparatus according to the drawing would hardly function with such a large distance between the frame plate and the heat exchanger plate.

That the drawing only shows a schematical and not a realistic picture of the apparatus is clear from the specification, which states that for increasing the sealing effect a recess for the flange of the lining should be done in the frame plate. That means that this patent publication discloses an apparatus that is impaired by the same problems as that according to the British Pat. No. 1.041.805.

This invention intends to remove the problems that are connected with known technics. This is made possible by the fact that the flange that is positioned between the frame plate and/or the pressure plate on one hand and a heat exchanger plate on the other hand is made so thin that it does not require recesses round the inlet ports and the outlet ports of the frame plate and/or the pressure plate, and that the flange is provided with a bulge, which functions as a seal between the heat exchanger plate on one hand and the frame plate and/or the pressure plate on the other hand.

A preferred embodiment of the invention shall be described more closely in connection with the accompanying drawings, in which:

FIG. 1 is a section through a lining divided into halves;

FIG. 2a–c disclose different connections between the one flange of the lining and the flange of a connecting tube.

Figure 1:
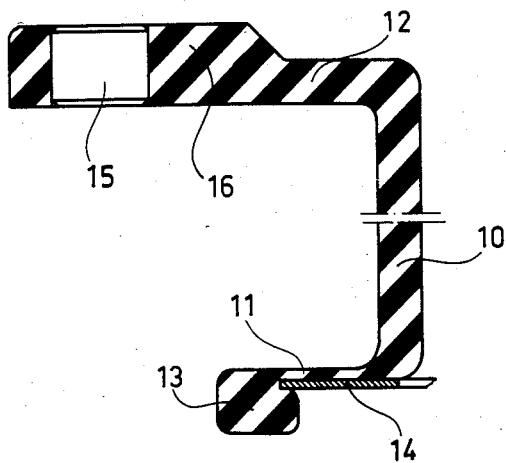

The lining is made of a non-metallic material and comprises a cylindrical part 10 with a flange 11, 12 on each side of the cylindrical part.

The flange 11 that is intended to rest against a heat exchanger plate is so thin that it can be applied on the outside of the side surface of the frame plate or the pressure plate without encroaching materially upon the structural measure of the heat exchanger. This is of extremely great importance, since due to that the usual machining in the form of a recess in the side surface of the frame plate and/or the pressure plate is eliminated.

The flange 11 discloses at its periphery a part that is thicker than the remaining part of the flange. This thick part comprises a bulge 13 that extends round the flange 11 and functions as a ring gasket of the closest heat exchanger plate. In this connection the heat exchanger plates are oriented such that the gasket grooves with the gasket are directed towards the frame plate. Thus, the ring gasket 13 is intended to fit into the pressed gasket groove of the first heat exchanger plate and functions as a seal between the heat exchanger plate and the frame plate. By this arrangement the flange 11 is locked in radial direction at the same time as the lining is centered in the right position in the hole cut out in the frame plate, which hole of tolerance reasons must be made with a certain excess.

The device can be provided with an annular disc 14, preferably a sheet made of steel, that rests against and protects the thin flange 11. In this connection the plate 14 is provided with a circular opening which essentially corresponds to the hole section of the lining 10.

The plate 14 is kept in place by the fact that its outer part projects a bit in under the bulge 13 and as an extra security measure can be glued or vulcanized onto the flange 11.

The other flange 12 of the lining 10 is intended to rest against a connecting flange of a connecting tube. In order to prevent that the flange 12 is compressed too much and runs the risk of being crushed during the mounting of the connecting tube, at least one distance means can be applied between the connecting tube flange on one hand and the frame plate and/or the pressure plate on the other hand (see FIGS. 2a–c).

Figure 2A:
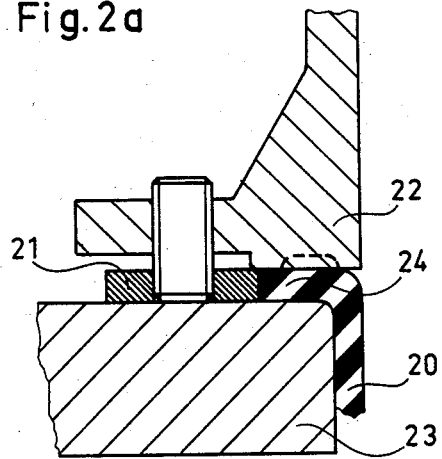
Figure 2B:
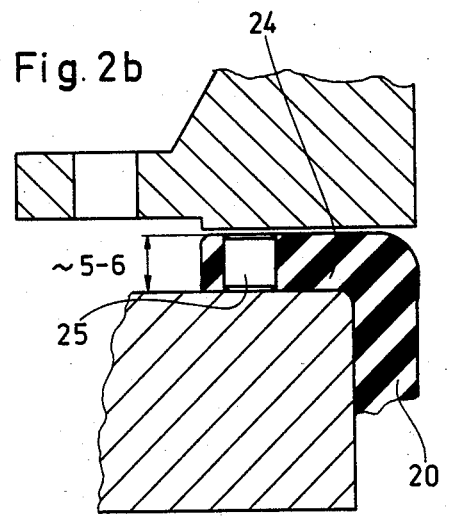
Figure 2C:
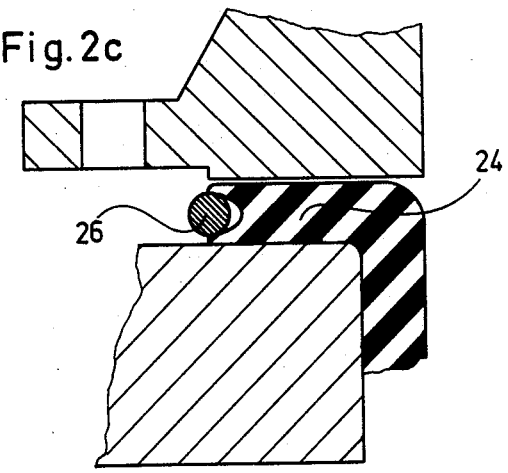
Figure 3:
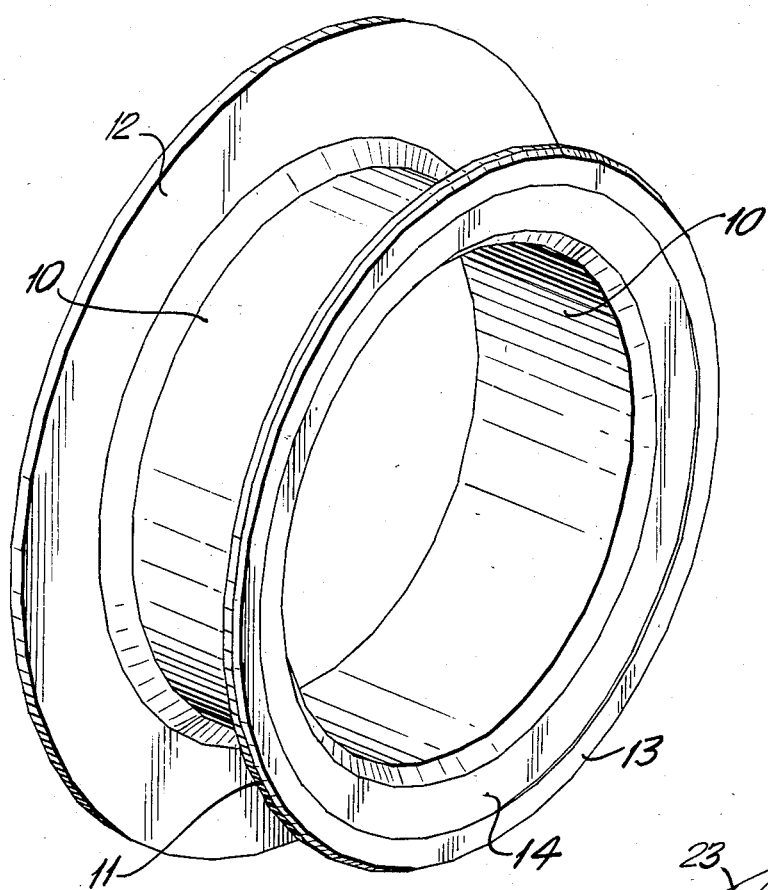
FIG. 3 is a perspective view of a preferred form of the new lining.

This spacer or distance means may comprise a loose or glued washer 21 on at least some of the pin bolts that connect the connecting tube 22 with the frame plate and/or the pressure plate 23 (FIG. 2a). In this case the diameter of the flange gasket 24 has to be coordinated with the diameter of the washer such that the distance means 21 gives the intended effect.

Another distance means may comprise a number of pins 25 inserted in the flange 24. In this connection the pins are suitably applied at the mounting procedure by gluing or press fit. Alternatively the pins can be vulcanized into the rubber. In the embodiment according to FIG. 1 the distance means comprises pins 15 fastened in the flange 12.

A third distance means comprises a metal ring 26 that is applied in a groove in the peripheral part of the flange 24. The ring that can be made of round iron, square iron or hexagon iron can be open and resilient or closed. The ring is fastened in the groove of the flange in a suitable way, for instance by means of vulcanization.

In order to make a reasonable compression of the outer part 16 of the flange 12 possible this part may have a larger wall thickness than the inner part.

The lining is preferably made of an elastic material, for instance rubber, the two flanges of the lining being made in one piece with the remaining part of the lining.

Figure 4:
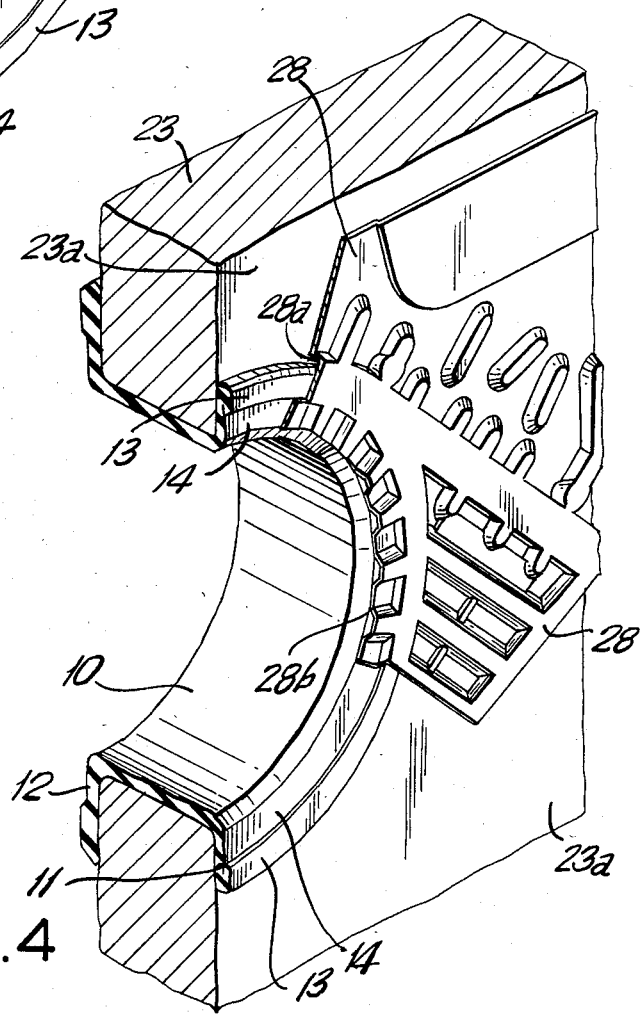
FIG. 4 is a perspective view, partly in section, of part of a frame plate with the lining applied to a port therein and engaging a portion of an adjacent heat exchange plate.

As shown in FIG. 4, frame plate 23 has a flat surface 23a facing a heat exchange plate of which a corner portion is shown at 28. Flange 11 of the lining engages an unmachined part of surface 23a (i.e., a part in the same plane as the surrounding part of this surface). Annular bulge 13, which forms a ring gasket, fits into a pressed groove of the heat exchange plate, as previously mentioned, this groove being shown at 28a. As will be understood by those skilled in the art, plate 28 has an opening 28b through which connecting tube 22 communicates with the interior of the heat exchanger.

We claim:

1. In combination with a plate heat exchanger having a plate member which is a frame plate or a pressure plate with opposite side surfaces, a connecting tube for passage of a fluid to or from the heat exchanger by way of a port in said plate member, and a heat exchange plate adjacent one of said side surfaces and having an opening through which said tube and port communicate with the interior of the heat exchanger, a lining of nonmetallic material for lining said port and comprising a cylindrical portion and a thin annular flange extending radially from one end of the cylindrical portion and integral therewith, said cylindrical portion covering the wall of said port and forming a passage interconnecting said tube and said opening in the heat exchange plate, said flange being interposed between the heat exchange plate and said plate member and resting against an unmachined part of said one surface, and an annular bulge integral with said flange and engaging said heat exchange plate around its said opening to form a seal between said plate member and the heat exchange plate.

2. The combination of claim 1, in which the heat exchange plate has a gasket groove, said bulge forming a ring gasket fitting into said groove.

3. The combination of claim 1, in which the lining comprises also a second annular flange extending radially from the other end of the cylindrical portion and integral therewith, the second flange engaging the other of said side surfaces.

4. The combination of claim 3, comprising also spacer means associated with said second flange to limit compression thereof between the connecting tube and said member.

5. The combination of claim 4 comprising also a bolt connecting said tube with said member, said spacer means including a washer applied to said bolt.

6. The combination of claim 4, in which said spacer means include pins fastened in said second flange.

7. The combination of claim 4, in which said second flange has a groove in a peripheral part thereof, said spacer means including a metal ring located in said groove.

8. The combination of claim 3, in which part of said second flange has a greater wall thickness at one part thereof than at the part adjacent said one part.

9. The combination of claim 1, comprising also an annular metal plate secured to said flange opposite the heat exchange plate and having an opening substantially aligned with said passage in said cylindrical portion.

10. The combination of 9, in which part of the bulge is in overlying engagement with said plate to secure the plate to said flange.

* * * * *